March 7, 1944.   W. L. MORRISON   2,343,315
TANK
Filed April 6, 1939
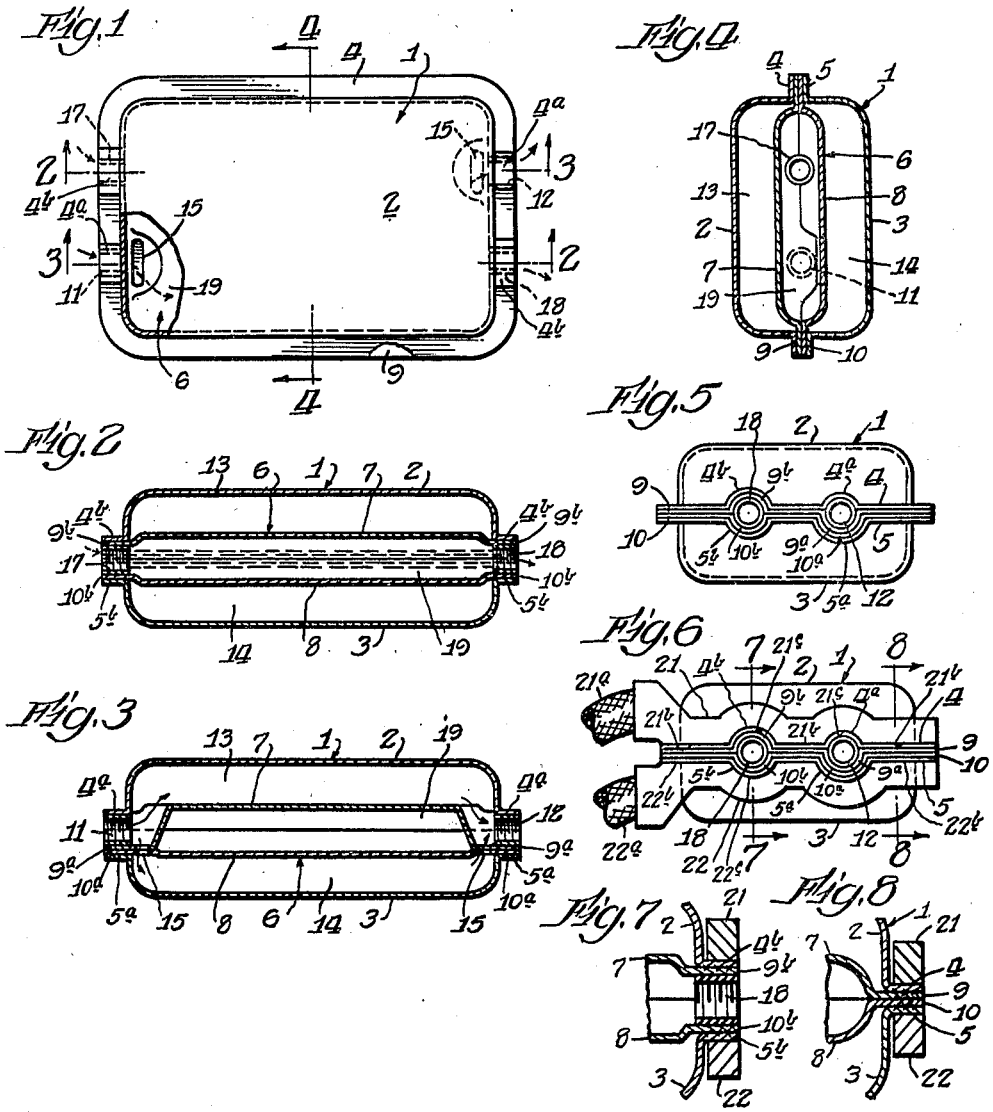
Inventor:
Willard L. Morrison
By Parker & Carter attys.

Patented Mar. 7, 1944

2,343,315

UNITED STATES PATENT OFFICE 2,343,315

TANK

Willard L. Morrison, Lake Forest, Ill.

Application April 6, 1939, Serial No. 266,241

3 Claims. (Cl. 257—245)

This invention relates to tanks and has for its object to provide a new and improved tank.

The invention has the further object to provide a tank made up of sheets of material formed with flanges which are welded together to form a tight joint.

The invention has the further object to provide a tank made up of sheets having projecting flanges which are welded together, the flanges having inlet and outlet openings between them.

The invention has further objects which are more particularly pointed out in the accompanying description.

Referring now to the drawing:

Fig. 1 is a plan view with parts broken away showing one form of the device embodying the invention;

Fig. 2 is a sectional view taken on the line 2—2 of Fig. 1;

Fig. 3 is a sectional view taken on the line 3—3 of Fig. 1;

Fig. 4 is a sectional view taken on the line 4—4 of Fig. 1;

Fig. 5 is an end view showing the outlets;

Fig. 6 is a view of the tank similar to Fig. 5 and showing the electrodes of a welding machine in position to weld the flanges of the tank together to form a tight joint;

Fig. 7 is a sectional view taken on the line 7—7 of Fig. 6; and

Fig. 8 is a sectional view taken on the line 8—8 of Fig. 6.

Like numerals refer to like parts throughout the several figures.

In constructing my invention I take sheets of any suitable metal. These sheets are formed so as to be bulged outwardly and with flanges all the way around, which are brought together and electrically welded. The flanges in the proper position are bent so as to form inlet and outlet openings, the metal around these openings being electrically welded together at the same time the rest of the flange sections are welded together.

When the parts are formed of the proper shape, they are then assembled together, with the flanges in contact, and the electrodes of the welding apparatus are then placed on opposite sides of the flanges and pressed tightly against the flanges, and the current is then turned on, and the flanges are then electrically welded together.

The tank 1 has an outer shell comprising sections 2 and 3 having outer flanges 4 and 5, and an inner shell 6 comprising sections 7 and 8 having outer flanges 9 and 10. An inlet bushing 11 and an outlet bushing 12 communicate with the space 13, and openings 15 in sections 7 and 8 (see Figs. 1 and 3) communicate between space 13 and space 14. Inlet bushing 17 and outlet bushing 18 are provided for the passage of liquid through the space 19 between sections 7 and 8.

The outer shell flange 4 is formed at 4a to fit bushings 11 and 12, and formed at 4b to fit bushings 17 and 18. The outer shell flange 5 is formed at 5a to fit bushings 11 and 12, and formed at 5b to fit bushings 17 and 18. The inner shell flange 9 is formed at 9a to fit bushings 11 and 12, and is formed at 9b to fit bushings 17 and 18. The inner shell flange 10 is formed at 10a to fit bushings 11 and 12, and is formed at 10b to fit bushings 17 and 18.

The various sheets after being formed are placed together, as shown for example in Figs. 1 to 6, with their flanges in contact, and the electrodes 21 and 22 of the welding apparatus are then placed in position on opposite sides of the flanges, as shown for example in Fig. 6. These electrodes, at the points where the inlets and outlets are located, are shaped to properly contact with the two outer flanges. These electrodes may be placed along only a part of the flanges at one time, or they may be placed entirely around the tank so that the flanges are all electrically welded together simultaneously.

I have shown in Fig. 6 the electrodes 21 and 22 as being connected with a source of current by cables 21a and 22a and as being pressed against the flanges 4, 9, 10 and 5, in any of the usual ways, and as having conforming surfaces 21b, 21c, 22b and 22c, to suitably conduct current through said flanges and around inlets 18 and 12. These electrodes may be arranged to weld the entire flange system at once if desired.

The tanks may be used for any purpose where it is desired to pass fluid through them and the plurality of tanks may be used as heat exchangers by passing fluids or liquids of different temperatures through the associated tanks.

I claim:

1. A tank comprising four sheet metal dish-shaped sheets, having smooth surfaces, brought together to form a plurality of separated receiving spaces for bodies of material to be kept separated, said sheets having continuous laterally projecting portions which extend entirely therearound and which are connected together to form sealed connections, opposed portions of said continuous laterally projecting parts being oppositely indented at separated points to form admission and discharge openings for the separated material receiving spaces, whereby a tank is provided of imperforate material having inlet and outlet openings.

2. A tank comprising outer separate sheets shaped to provide a receiving space for material, and inner sheets formed to provide a separate space for material, outwardly extending flanges on all of said sheets, the flanges of the outer sheets overlying the flanges of the inner sheets, openings to the outer space formed by the outer sheets being provided by oppositely indenting the flanges of one outer sheets, on the one hand, and of the remaining sheets, on the other hand, at a plurality of points.

3. A tank comprising outer separate sheets shaped to provide a receiving space for material, and inner separate sheets shaped to provide a separate space for material on the interior of the space formed by the outer sheets, outwardly extending overlying flanges on all of said sheets, said flanges being shaped to form separate admission openings for the space between the outer sheets and the space between the inner sheets and separate discharge openings for the space between the outer sheets and the space between the inner sheets, a line connecting the admission opening and the discharge opening for the space between the outer sheets crossing the line between the admission opening and the discharge opening for the space between the inner sheets.

WILLARD L. MORRISON.